(12) United States Patent
Pastorello

(10) Patent No.: US 6,557,051 B1
(45) Date of Patent: Apr. 29, 2003

(54) THROUGHPUT FOR A SERIAL INTERFACE

(75) Inventor: Douglas F. Pastorello, Hudson, NH (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/484,129

(22) Filed: Jan. 15, 2000

(51) Int. Cl.[7] .............................................. G06F 13/14
(52) U.S. Cl. ............................ 710/23; 710/61; 710/20; 710/209; 710/212
(58) Field of Search ............................ 710/23, 20, 61; 709/212

(56) References Cited

U.S. PATENT DOCUMENTS 4,873,671 A * 10/1989 Kowshik et al. ....... 365/189.12
5,369,618 A * 11/1994 Takasugi ................ 365/230.01
5,815,456 A *  9/1998 Rao ....................... 365/230.03
6,032,204 A *  2/2000 Huff et al. .................. 710/23

* cited by examiner

Primary Examiner—Jeffrey Gaffin
Assistant Examiner—Abdelmoniem Elamin
(74) Attorney, Agent, or Firm—Steven Lin, Esq.

(57) ABSTRACT

A serial interface or port is configured so that: a Read command and a Write command can be performed substantially simultaneously; a shortened Read command, followed by another Read command, can be performed in reduced time, due to the shortening of the first Read command; and a continuous stream of Read commands can be performed consecutively with no time delay By performing Read and Write commands simultaneously on associated channels at a serial interface, the time required for such performance is reduced by as much as 50 percent.

18 Claims, 7 Drawing Sheets

POWER METER SERIAL PORT

THROUGHPUT FOR A SERIAL INTERFACE

BACKGROUND OF THE INVENTION

1. Field of the Invention

This invention relates to enhancing Read and Write operations of an integrated circuit serial interface.

2. Description of the Related Art

Data transfer at a serial port or interface, using Read and Write commands, is relatively slow, because each byte is read or written bit-by-bit in single file. No use is made of the possibility of reading and/or writing data simultaneously, or taking advantage of other situations consistent with the constraints imposed by use of a serial interface.

What is needed is an approach that allows an increase in the effective rate of performance of Read and Write operations at a serial interface. Preferably, the approach should allow for an increased rate of operation where the operation involves two consecutive Read commands or a Read command followed by a Write command and should allow data transfer rate improvement where the Read commands are continuous and where the Read commands interrupt each other.

SUMMARY OF THE INVENTION

These needs are met by the invention, which uses an input serial interface and an output serial interface, whose operations are synchronized, to perform certain operations in tandem and to thus achieve some of the benefits of a parallel port or interface. In a first embodiment, a Read command is performed on one communication channel and a subsequent Write command that is received is performed synchronously on another communication channel.

In another embodiment, a first Read command is received on a first communication channel, followed by a sequence of K NOP (no operation) commands, where 0 K<N−1 and N is the number of data units (bytes, nibbles or other fixed length consecutive sequences of data bits, referred to collectively herein as "data units") used to represent a data word, followed immediately by a second Read command. This sequence of commands will interrupt the performance of the first Read command after K+1 data units of the first word are read on a second communication channel and will begin reading the first data unit of the second word on the second channel. This truncation of a Read command, before all data units of a word have been Read is especially useful where the word to be read is a control or supervisory word for which all data units need not be read. Reading of the first word can be terminated after K+1 data units have been read, thus allowing a portion of another command to be executed in the time slot(s) that would have been used to read the remaining N−K−1 data units of the first word.

In another embodiment, a first Read command received on a first communication channel, followed by a sequence of N−1 NOP commands, followed by a second Read command, will cause the first Read operation to be performed on all N data units of the first word before at least one data unit of the second word is read, as part of a continuous read operation, in a pattern in which no time slot is unused.

DESCRIPTION OF BEST MODES OF THE INVENTION

Data transfer is initiated by issuing a command that reads from, or writes to, a register. The serial interface of interest here has a first associated input communication channel (SDI) and a second associated output communication channel (SDO), each having a width of one bit. The data unit used here is a byte or octet (eight bits), but this number can be changed to any reasonable data unit length.

Figure 1:
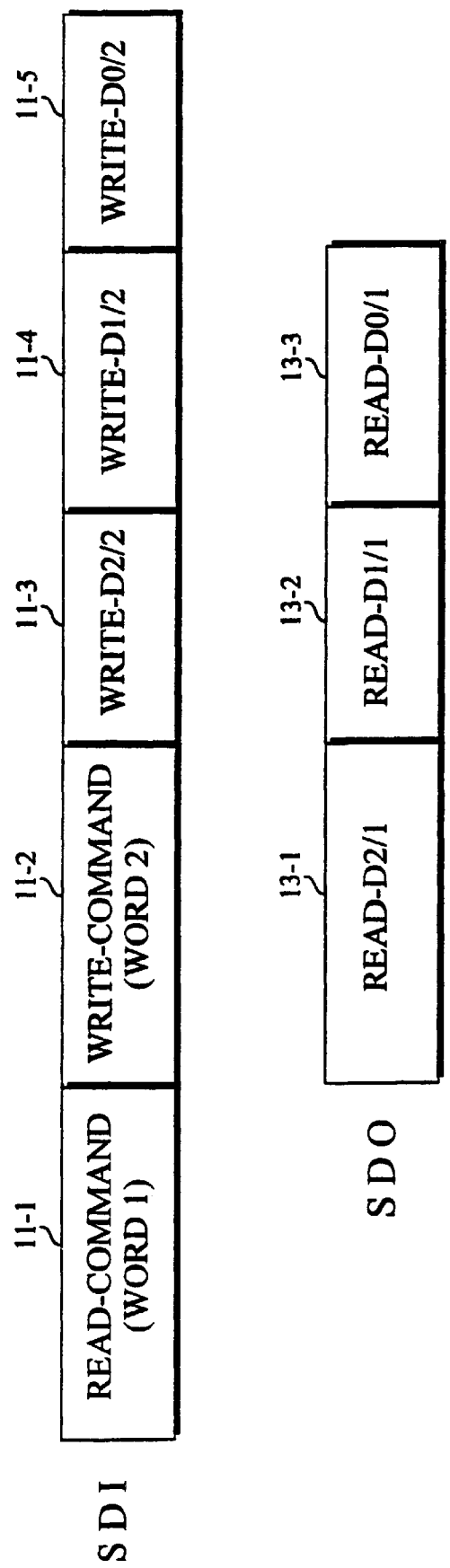
FIGS. 1, 2, 3 and 4 schematically represent time slots for four sequences of commands, received on a first (SDI) channel associated with the serial interface, and four sequences of data units Read or Written on a second channel in response to receipt of the four commands.

FIG. 1 schematically illustrates a first embodiment of the invention. A Read command for a first word is received on the first channel SDI at the serial interface, in the eight-bit data unit indicated as "Read-command", 11-1, and N bytes (taken to be N=3 here, for purposes of illustration) are read in the order Read-D2/1 (13-1: MSByte), Read-D1/1 (13-2) and Read-D0/1 (13-3: LSByte), on the second channel SDO, in three time slots on SDO that follow the time slot 11-1 in time. A Write command for a second word (which may be, but need not be, the same as the first word), including N data units, is assumed to be received on the first channel SDI, immediately following receipt of the Read command, in a time slot 11-2 that is substantially co-extensive in time with the time slot 13-1 in the second channel SDO. The first N−1 data units of the second word, indicated as: Write-D2/2 (11-3: MSByte) and Write-D1/2 (11-4), are received in time slots that are substantially co-extensive in time with the time slots 13-2 and 13-3, respectively, and the last data unit (no. N) of the second word, Write-D0/2, is received in a time slot that follows the time slot 11-4 The total number of time slots used for one Read command, followed immediately by one Write command, is N+2 (here, equal to 5), rather than 2N+2, which would be the time slots consumed in a conventional approach for Read-then-Write. The savings in use of time slots is N/(2N+2), which is 37.5 percent for the choice N=3 and has an upperbound of 50 percent for very large N.

Figure 2:
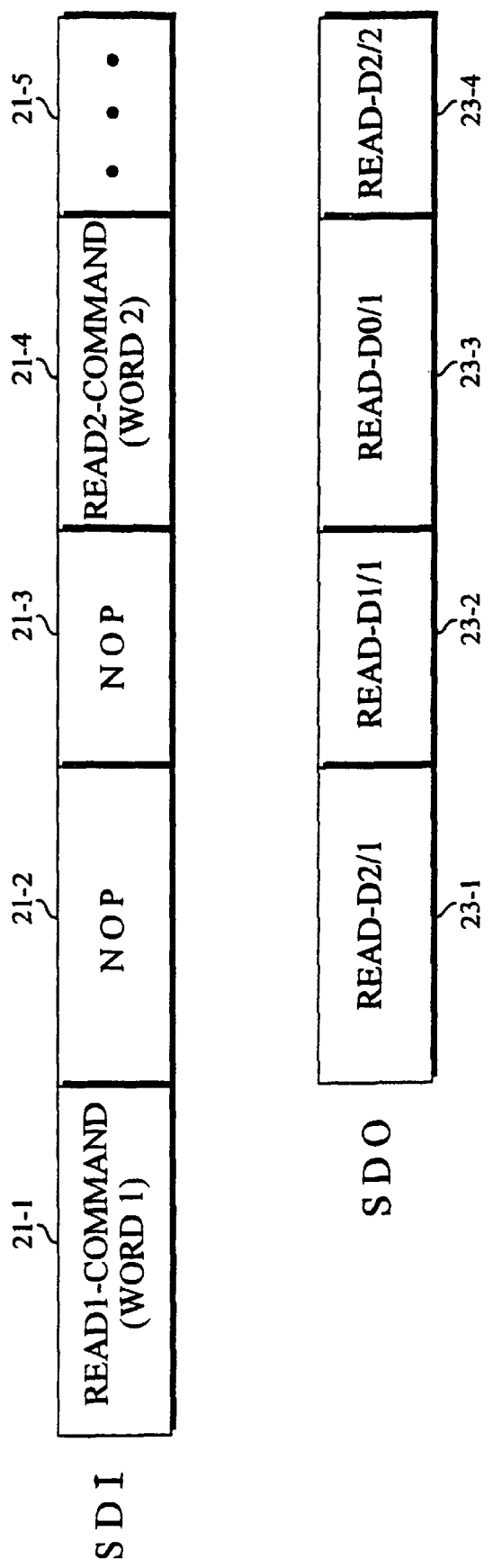

FIG. 2 schematically illustrates a second embodiment of the invention. A Read command for a first word is received on the first channel SDI at the serial interface, in the eight-bit data unit indicated as "Read 1-command", 21-1, and N bytes are read in the order Read-D2/1 (23-1: MSByte), Read-D1/1 (23-2) and Read-D0/1 (23-3: LSByte), on the second channel SDO, in N time slots that follow the time slot 21-1 in time. The serial interface next receives N−1 "NOP" commands, each being a placeholder that indicates that no new command is to be performed, in the time slots 21-2 and 21-3. A Read command for a second word (which may be, but need not be, the same as the first word), is assumed to be received on the first channel SDI, immediately following receipt of the first Read command and the N−1 NOP commands, in a time slot 21-4. The N data units of the first word are read on the second channel SDO, in time slots 23-1, 23-2 and 23-3 that are co-extensive with the N time slots 21-2, 21-3 and 21-4, respectively. A first data unit of the second word, indicated as Read-D2/2 (MSByte), is read in the time slot 23-4 in the second channel SDO. Additional data units of the second word will be read in the second channel SDO if the subsequent time slots 21-5, etc. in the first channel contain one or more NOP commands. The total number of time slots used for executing J commands (N data units each) is J.N+1, as compared with the number, J(N+1), used in a conventional approach, a savings of 42.3 percent for N=3, when J is large.

Figure 3:
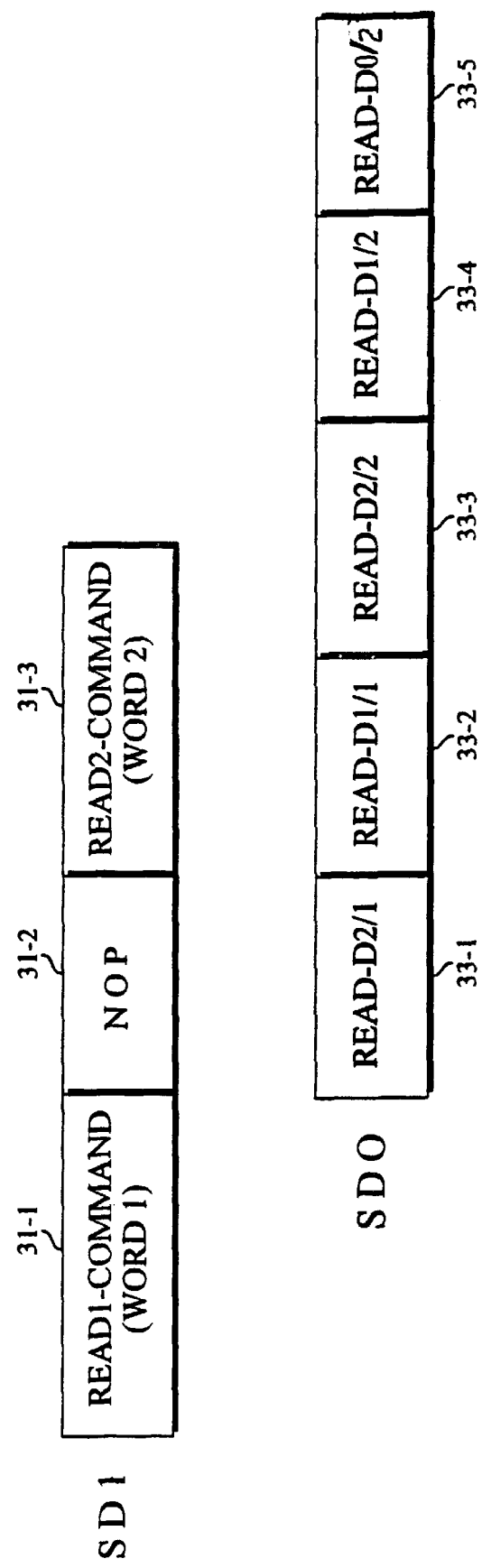

FIG. 3 schematically illustrates a third embodiment of the invention. A Read command for a first word is received on the first channel SDI at the serial interface, in the eight-bit data unit indicated as "Read 1-command", 31-1, and N bytes would normally be read in the order Read-D2/1 (33-1: MSByte), Read-D1/1 (33-2) and Read-D0/1 (33-3: LSByte), on the second channel SDO, in N time slots that follow the time slot 31-1 in time. The serial interface next receives K "NOP" commands, with $0 \leq K \leq N-2$, in K subsequent time slots, 31-2, . . . , 31-(K+1), on the first channel. K NOP commands are assumed to be received on the first channel SDI, immediately following receipt of the first Read command at time slot 31-1, and, a Read command for a second word (which may be, but need not be, the same as the first word). In a subsequent time slot (here, 31-3) on the first channel. The first K+1 data units of the first word are read on the second channel SDO in the time slots 33-1, . . . , 33-K+1) that are co-extensive with the K+1 time slots 31-2, . . . , 31-(K+2), respectively.

Figure 4:
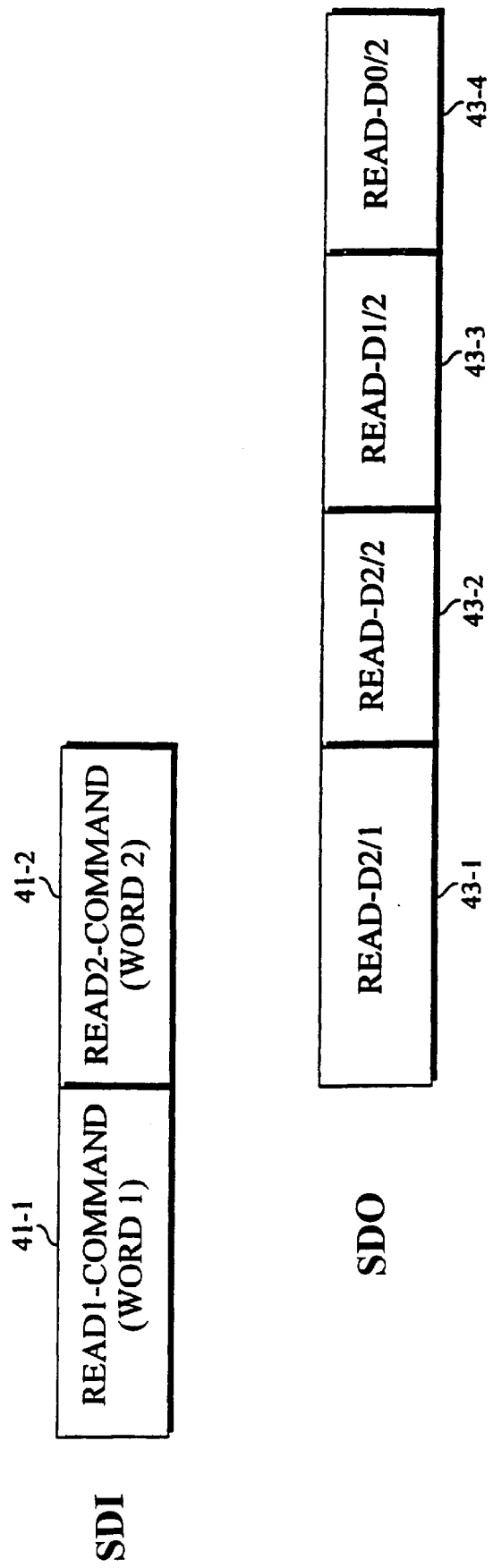

If K=0, as in FIG. 4, only one data unit of the first word is read, followed by one or more data units of the second word, Read-D2/2, Read-D1/2, Read-D0/2 that appear in the second channel in time slots 43-2, 43-3, 43-4.

Figure 5:
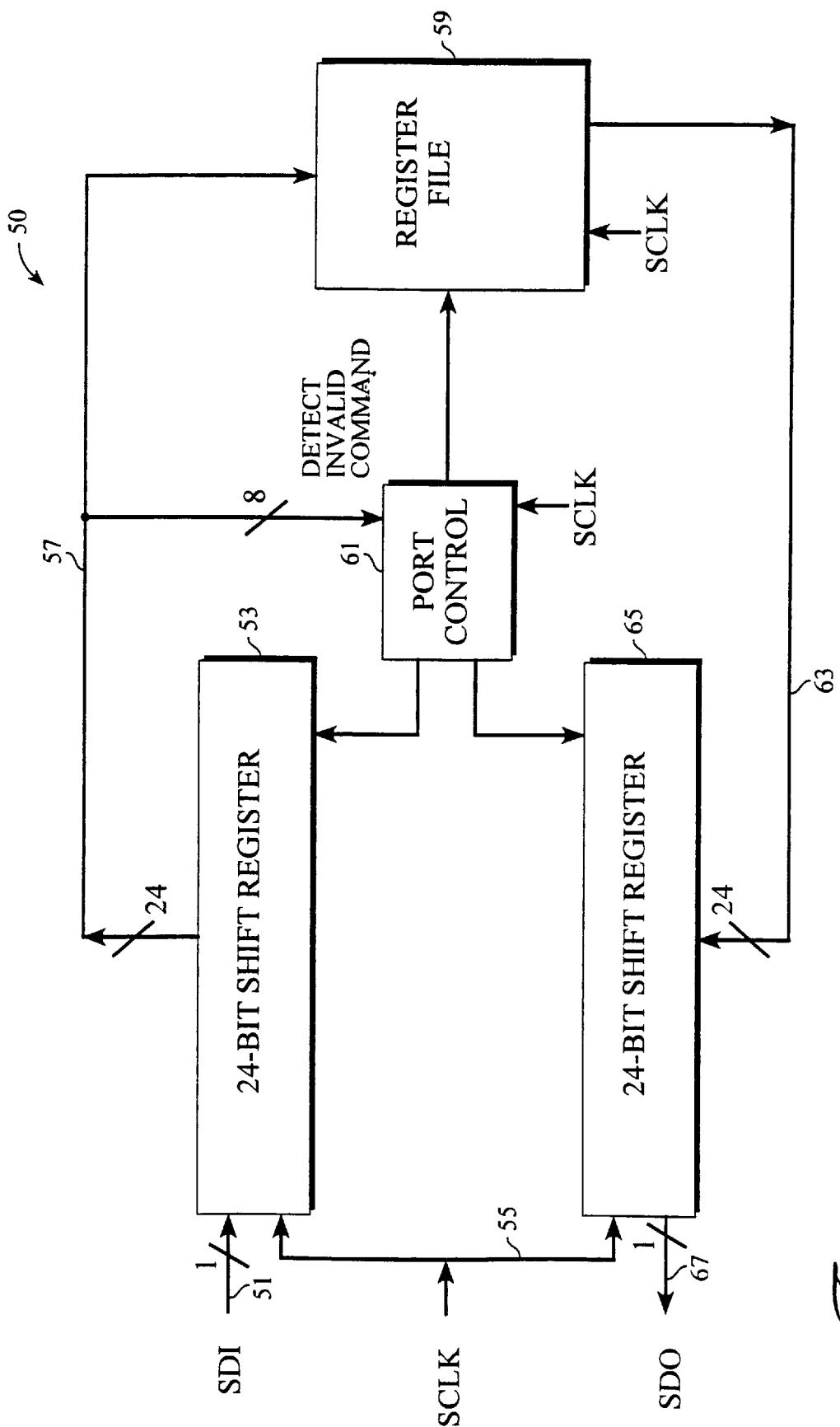
FIG. 5 is a schematic view of apparatus that may be used to practice the invention.

Referring now to FIG. 5, there is shown a schematic view of apparatus 50 configured to practice the invention. A signal in the form of a one-bit stream arrives on an input signal line 51 and is received by a first 24-bit shift register 53 that is driven by timer signal SCLK received on a timer signal line 55 from a serial interface timer (not shown). The input signal line 51 and the first shift register 53 serve as part of the first communication channel SDI. Approximately once every 24 timer pulses, or more often or less often if desired, the contents of the first shift register 53 are shifted from the first shift register 53, preferably as a parallel stream, on a 24-bit first intermediate signal transfer line 57 to a register file 59 that holds these 24 bits until these data are needed. The register file 59 is also driven by the timer signal SCLK. At appropriate times, the register file receives a "Transfer Data" command from a port control module 61, also driven or synchronized by the timer signal SCLK, and transfers the 24 bits of data, preferably as a parallel stream, on a second intermediate signal transfer line 63 from the register file 59 to a second 24-bit shift register 65 that is also driven by the timer signal SCLK. When the second shift register 65 is filled with data and/or receives an appropriate command from the port control module 61, the 24 bits are transferred out on a one-bit output signal line 67. The second shift register 65 and output signal line 67 serve as part of the second communication channel SDO. A signal represented by 24 data bits can be transferred through the apparatus (input signal line 51 to output signal line 67) in approximately 8+24+8+24=64 timer pulses. Use of a multi-data unit of size 24 bits is not required here. Any reasonable size, such as 4 bits, 6 bits, 8 bits, 12 bits, 16 bits, 18 bits, 20 bits, 24 bits, 28 bits, 30 bits, 32 bits, etc., can be used for the first and second shift registers 53 and 65 and for the first and second intermediate signal transfer lines 57 and 63.

Figure 6A:
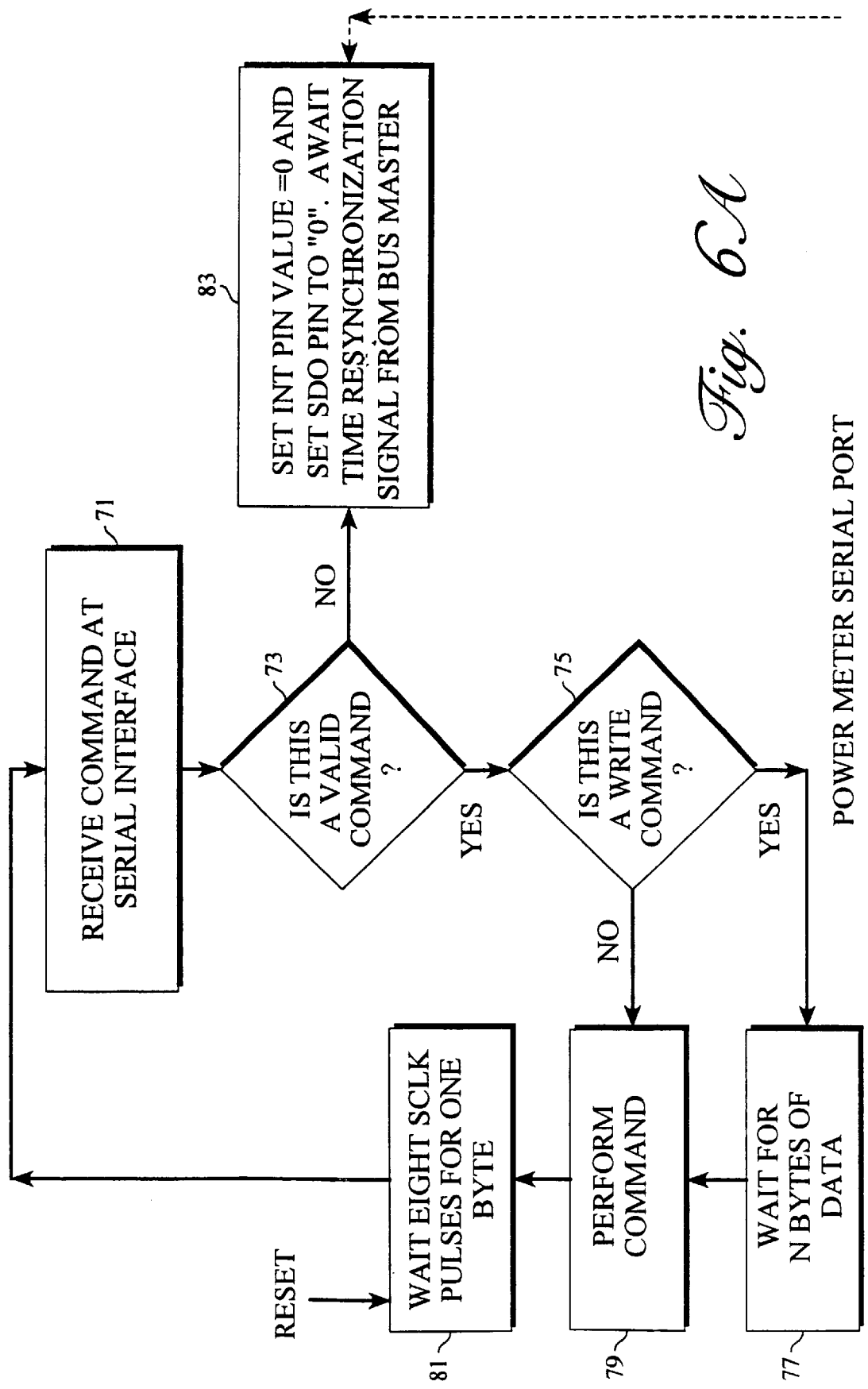
FIG. 6 is a flow chart of a procedure that can be used to practice an embodiment of the invention.
Figure 6B:
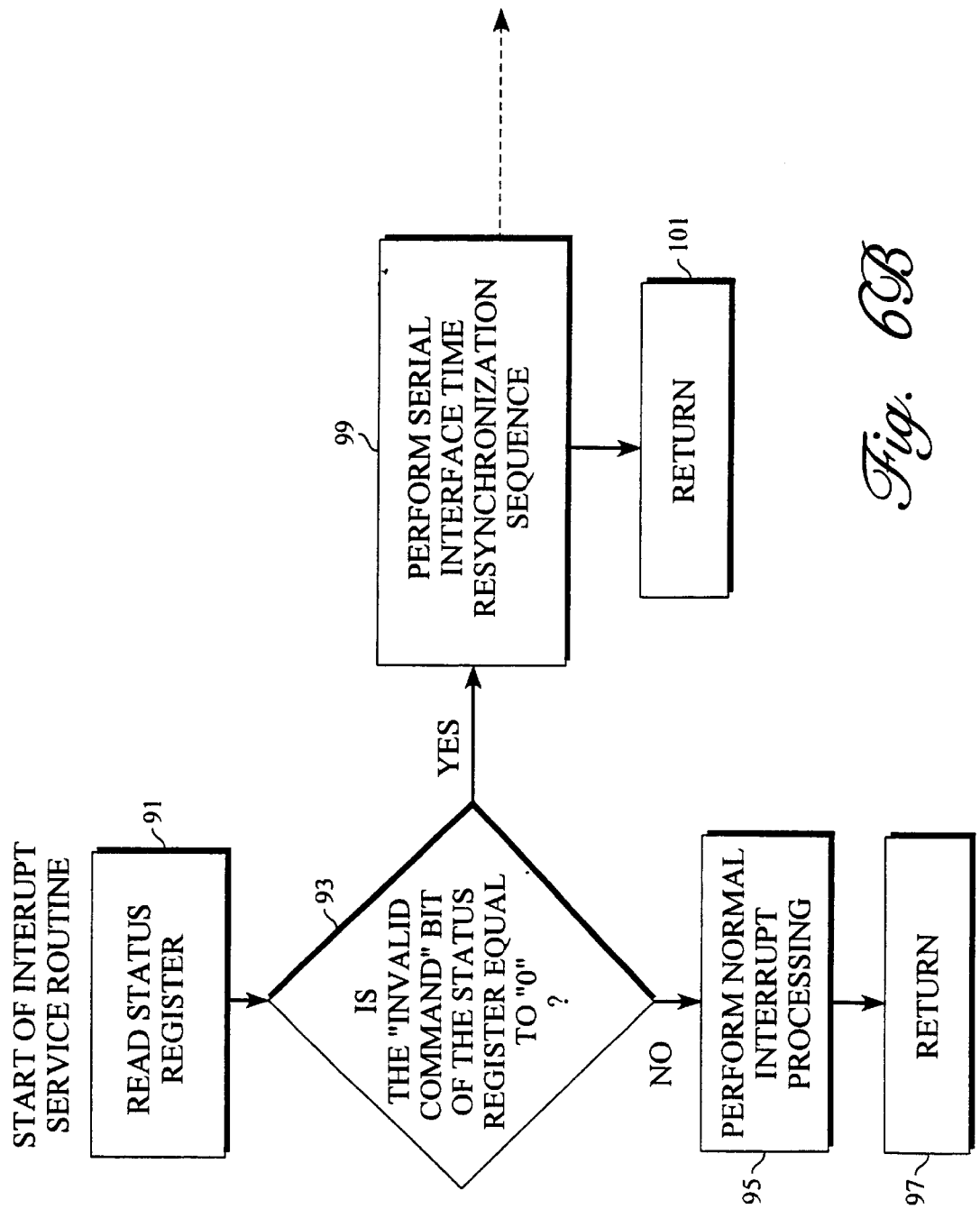

FIG. 6 provides a flow chart of the embodiment involving detection of loss of time synchronization, at a serial interface and at a bus master, respectively. The system resets, in step 81, and waits eight timer pulses for the next command byte. A serial interface receives a command, at step 71 and determines, in step 73, whether this command is a valid command. When the answer to the question in step 73 is "yes", the system proceeds to step 75 and determines if the command is a Write command. If the answer to the question in step 75 is "yes", the system moves to step 77 and waits for N bytes of data (to be written), then moves to step 79 to perform this command. When the answer to the question in step 75 is "no", the system moves directly to step 79 and performs the command.

When the answer to the question in step 73 is "no", the system sets an associated INT pin value equal to 0 and awaits receipt of a time resynchronization signal from the bus master, in step 83.

The embodiments discussed in the preceding a serial interface or port to be configured so that Read and Write commands are executed substantially simultaneously, so that two or more consecutive Read commands can be executed in a continuous, unbroken stream, and so that a shortened Read command, not requiring processing of all bytes of the word that is read, can be processed in a shorter time interval and the channel cleared for processing of the next instruction.

What is claimed is:

1. A method of reading and writing data at an integrated circuit serial interface, the method comprising:

receiving a sequence of Read commands and Write commands at an integrated circuit;

when a Read command is received and is followed immediately by a Write command, on a first communication channel:

reading an ordered sequence of data read units, numbered 1, 2, . . . , N on a second communication channel, where N is a selected positive integer representing the number of consecutive data units in a data word;

writing an ordered sequence of data write data units, numbered 1, 2, . . . , N−1, on the first channel simultaneously when the data read units numbered 2, . . . , N are being read on the second channel; and writing a data write data unit number N on the first channel after the read data units number 1, 2, . . . , N have been read on the second channel.

2. The method of claim 1, further comprising choosing at least one of said data read data unit and said data write data unit to be a byte.

3. The method of claim 1, further comprising choosing said integer N to be 3.

4. An improved method of reading data in an integrated circuit, the method comprising:

receiving a command to read a first word, followed immediately by receipt of K NOP commands, followed immediately by receipt of a command to read a second word, on a first communication channel, where K is a non-negative integer satisfying $0 \leq K \leq N-2$ and N is a positive integer representing the number of consecutive frames in a data word;

reading K+1 data units of the first word on a second communication channel; and reading at least one data unit of the second word on the first communication channel simultaneously during at least part of the reading of the K+1 data units of the first word on the second communication channel.

5. The method of claim 4, further comprising choosing said data read data unit to be a byte.

6. The method of claim 4, further comprising choosing said integer N to be 3.

7. An improved method of reading data in an integrated circuit, the method comprising:

receiving a Read command to read a first word, followed immediately by N−1 NOP commands, followed immediately by a Read command to read a second word, on a first communication channel, where N is a positive integer representing the number of data units in a word;

reading N data units of the first word on a second communication channel; and reading at least one data unit of the second word on the first communication channel simultaneously during at least part of the reading of the first word on the second communication channel.

8. The method of claim 7, further comprising choosing said data unit to be a byte.

9. The method of claim 7, further comprising choosing said integer N to be 3.

10. Apparatus for reading and writing data in a programmable integrated circuit, wherein the integrated circuit is programmed:

to receive a sequence of Read commands and Write commands from a microprocessor;

when a Read command is received and is followed immediately by a Write command, on a first communication channel:

to read an ordered sequence of data read units, numbered 1, 2, . . . , N, on a second communication channel, where N is a selected positive integer representing the number of consecutive data units in a data word;

to write an ordered sequence of data write data units, numbered 1, 2, . . . , N−1, on a first channel simultaneously when the data read units numbered 2, . . . , N are being read on the second channel; and to write a data write data unit number N on the first channel after the read data units number 1, 2, . . . , N have been read on the second channel.

11. The apparatus of claim 10, wherein at least one of said data read data unit and said data write data unit is chosen to be a byte.

12. The apparatus of claim 10, wherein said integer N is chosen equal to 3.

13. Apparatus for reading data in a programmable integrated circuit, wherein the integrated circuit is programmed:

to receive a command to read a first word, followed immediately by receipt of K NOP commands, followed immediately by receipt of a command to Read a second word, on a first communication channel, where K is a non-negative integer satisfying $0 \leq K \leq N-2$ and N is a positive integer representing the number of consecutive frames in a data word;

to read K+1 data units of the first word on a second communication channel; and to read at least one data unit of the second word on the first communication channel simultaneously during at least part of the reading of the K+1 data units of the first word on the second communication channel.

14. The apparatus of claim 13, wherein said data read data unit is chosen to be a byte.

15. The apparatus of claim 13, wherein said integer N is chosen equal to 3.

16. Apparatus for reading data in a programmable integrated circuit, wherein the integrated circuit is programmed:

to receive a Read command to read a first word, followed immediately by N−1 NOP commands, followed immediately by a Read command to read a second word, on a first communication channel, where N is a positive integer representing the number of data units in a word;

to read N data units of the first word on a second communication channel; and to read at least one data unit of the second word on the first communication channel simultaneously during at least part of the reading of the first word on the second communication channel.

17. The apparatus of claim 16, wherein said data unit is chosen to be a byte.

18. The apparatus of claim 13, wherein said integer N is chosen equal to 3.

* * * * *